United States Patent
Lorber et al.

(10) Patent No.: US 6,203,269 B1
(45) Date of Patent: Mar. 20, 2001

(54) CENTRIFUGAL AIR FLOW CONTROL

(75) Inventors: Peter F. Lorber, Coventry; Wesley K. Lord, South Glastonbury, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/257,483

(22) Filed: Feb. 25, 1999

(51) Int. Cl.[7] .............................. F01D 5/14; F01D 5/26; B64C 21/04

(52) U.S. Cl. .................... 415/115; 415/119; 415/914; 416/91; 244/207

(58) Field of Search ................................ 415/115, 119, 415/914; 416/91, 90 A, 90 R; 244/207

(56) References Cited

U.S. PATENT DOCUMENTS

| | | | |
|---|---|---|---|
| 2,156,133 | * | 4/1939 | Troller .................................. 415/914 |
| 2,638,990 | * | 5/1953 | Pitcairn ................................ 415/914 |
| 3,144,220 | * | 8/1964 | Kittelson .............................. 415/914 |
| 4,045,146 | | 8/1977 | Crimi ....................................... 416/1 |
| 5,209,438 | | 5/1993 | Wygnanski .......................... 244/203 |
| 5,758,823 | | 6/1998 | Glezer et al. ........................... 239/4 |
| 5,813,625 | * | 9/1998 | Hasssan et al. ...................... 415/119 |
| 6,004,095 | * | 12/1999 | Waitz et al. .......................... 415/914 |

FOREIGN PATENT DOCUMENTS

| | | |
|---|---|---|
| 3505823 | 8/1986 | (DE) . |
| 19632207 | 2/1998 | (DE) . |
| 60-022098 | 2/1985 | (JP) . |
| 7301102 | 11/1995 | (JP) . |

OTHER PUBLICATIONS

Bannister, W.S. et al, "The Use of Boundary Layer Control on Wind Turbines A Feasibility Study (Patent Pending)" European Community Wind Energy Conference, Sep. 10–14, 1990, pp. 223–226.

Wygnanski, I., & Seifert, A., "The Control of Separation by Periodic Oscillations", 18th AIAA Aerospace Ground Testing Conference, Colorado Springs, CO, Jun. 20–23, 1994.

Amitay, M., Smith, B.L., & Glezer, A., "Aerodynamic Flow Control Using Synthetic Jet Technology", AIAA Paper No. 98–0208, 36th Aerospace Sciences Meeting & Exhibit, Reno, NV, Jan. 12–15, 1998.

Smith, D., Amitay, M., Kibens, V., Parekh, D., & Glezer, A., "Modification of Lifting Body Aerodynamics Using Synthetic Jet Actuators", AIAA Paper No. 98–0209, 36th Aerospace Sciences Meeting & Exhibit, Reno, NV, Jan. 12–15, 1998.

(List continued on next page.)

*Primary Examiner*—Edward K. Look
*Assistant Examiner*—Richard Woo

(57) ABSTRACT

Blades, including helicopter rotor blades, gas turbine engine fan blades, air moving machinery fan blades, and the like, have an air inlet near the hub of the blade, which may be on the pressure side of the blade and/or near the leading edge or trailing edge nearer the tip of the blades, with an air plenum between the air inlet and the slots, whereby air is forced into the inlet, through the plenum and out of the slots into the flow adjacent the blades. The slots may be through the suction surface of the blade, typically near the boundary layer separation point, so that air flowing out of the slots into the boundary layer of the suction surface of the blade, thereby delay or prevent the onset of boundary layer separation, or to reduce supersonic shock. The inlet may be near the trailing edge of the blade, near the root, adjacent to the air inlet of the core of a jet engine, to suction off air and reduce fan wake blockage at the core inlet. The slots may be through the pressure surface adjacent the blade tip edge of fan blades to reduce blade tip leakage effects.

16 Claims, 5 Drawing Sheets

OTHER PUBLICATIONS

Seifert, A. & Pack, L.G., "Oscillatory Control of Separation at High Reynolds Numbers", AIAA Paper No. 98–0214, 36th Aerospace Sciences Meeting & Exhibit, Reno, NV, Jan. 12–15, 1998.

Rediniotis, O.K., Ko, J., Yue, X. & Kurdila, A.J., "Synthetic Jets, Their Reduced Order Modeling and Applications to Flow Control", AIAA Paper No. 99–1000, 37th Aerospace Sciences Meeting & Exhibit, Reno, NV, Jan. 12–15, 1999.

* cited by examiner

CENTRIFUGAL AIR FLOW CONTROL

CROSS REFERENCE TO RELATED APPLICATIONS

Commonly owned copending U.S. patent applications filed contemporaneously herewith, Ser. Nos. 09/257,565, 09/257,563, and 09/257,564), contain subject matter related to that disclosed and claimed herein.

TECHNICAL FIELD

This invention relates to centrifugal pumping of ambient air to drive nozzles directed into the boundary layer on a blade, such as a fan blade or a helicopter rotor blade.

BACKGROUND ART

Gas flow in the shear layer adjacent to a surface exhibits a reduction in velocity due to friction of the molecular viscosity interacting with the surface, which results in a strong velocity gradient as a function of perpendicular distance from the surface: essentially zero at the surface, raising to mainstream velocity at the outer edge of the boundary layer. The reduced velocity results in a lower momentum flux, which is the product of the density of the gas times the square of its velocity. Along a diverging surface (that is, a surface that tails away from the mean flow direction), as is the case on the suction side of an airfoil (such as a fan blade or helicopter blade), the flow along the surface is accompanied by a pressure rise, which is accomplished only by conversion of momentum flux. The momentum and energy of the gas along the surface is consumed in overcoming the pressure rise and friction so that the gas particles are finally brought to rest and the flow begins to break away from the wall, resulting in boundary layer separation, downstream of the separation point. Boundary layer separation typically results in the termination of pressure rise (recovery) and hence loss in performance (e.g., airfoil lift) and dramatic decrease in system efficiency, due to conversion of flow energy into turbulence, and eventually into heat. It is known that boundary layer separation can be deterred or eliminated by increasing the momentum flux of the gas particles flowing near the surface. In the art, the deterrence or elimination of boundary layer separation is typically referred to as "delaying the onset of boundary layer separation".

One method for overcoming boundary layer separation is simply blowing high energy gas tangentially in the downstream direction through a slot to directly energize the flow adjacent to the surface. This technique, however, requires a source of pressure and internal piping from the source to the orifices at the surface. This greatly increases the cost, weight and complexity of any such system, and have not as yet been found to be sufficiently effective to warrant any practical use.

In the helicopter art, it is known that retreating blade stall establishes limits on rotor load and flight speed. In addition to the loss of capability to generate lift, unsteady blade stall transmits very large impulsive blade pitching moments to the flight control system.

In order to prevent excess control loads, stall boundaries are set as a function of rotor load and flight speed. Stall boundaries define the maximum blade loads, which impact maneuverability and agility as well as speed and payload. Improved payload capability can arise from gains in aerodynamic efficiency in hover via reduction of tip stall and in forward flight via reduction in retreating blade stall. In axial flow, gas turbine engines, such as those used in military aircraft and in commercial transport aircraft, a totally different problem is fan blade wake blockage at the entrance to the core region (low compressor) of the engine. This occurs near the root of the blade.

Yet another problem in any fan is blade tip leakage. To date, no scheme has been found to solve these problems which does not ultimately degrade overall engine performance, due to energy consumed by the compensating apparatus, or parasitic impact on the overall system.

DISCLOSURE OF INVENTION

Objects of the invention include improved boundary layer flow, improved deterrence of boundary separation, increased efficiency of airflow machinery, increased efficiency and lift in helicopter rotor blades, increased efficiency and lift in vertical takeoff and landing aircraft propellers, increased efficiency in gas turbine aircraft engines, reduced fan blade wake blockage in jet engine core inlets, reduced blade tip leakage effects in fans, boundary layer control which is effective, efficient, having low initial cost and zero operating costs, and boundary layer control which is relatively simple and provides low parasitic impact on the host structures and systems.

According to the present invention, a flow of air directed into the gaseous flow (such as air) adjacent to a rotating airfoil or blade is passively powered by centrifugal force, ambient air entering the blade near the hub being forced outwardly to and through one or more slots in the blade's surface, closer to the tip, thereby to control the flow adjacent to the blade. In further accord with the invention, the blade may be a helicopter rotor blade, or a fan blade. In still further accord with the invention, the blade may be in the first stage of a gas turbine engine, or in an air moving machinery fan.

In one application of the invention, the airflow is directed at a low angle of incidence (essentially tangentially) in the vicinity of the boundary layer separation point of a fan blade or an airfoil, thereby to deter or prevent boundary layer separation. The invention provides gas particles into the downstream boundary layer which have higher momentum flux than gas particles of the upstream boundary layer, thereby to deter the onset of boundary layer separation; the gas particles may preferentially be injected essentially tangentially to the boundary layer.

In another application of the invention, the airflow is directed into the flow adjacent the surface of jet engine fan blades, the tips of which are rotating at supersonic speeds, at a point near or aft of mid-chord, where supersonic shock and boundary layer separation occur. This reduces the Mach number gradient to thereby increase efficiency.

According further to the present invention, air passing through the fan of an axial fan gas turbine engine, near the root of the fan, is suctioned off by a slot in the suction side of the blade near the root, to reduce fan blade wake blockage and thereby increase the efficiency of flow into the core engine (low compressor). In accordance with the invention, the suctioned air is pumped centrifugally through the hollow blades and discharged closer to the tip of the blades; in one embodiment, the air is discharged on the suction side, near or aft of mid chord of the blade, thereby to reduce shock and delay the onset of boundary layer separation; in another embodiment, the suctioned air is discharged on the pressure side of the tips of the blade, thereby to reduce blade leakage effects.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
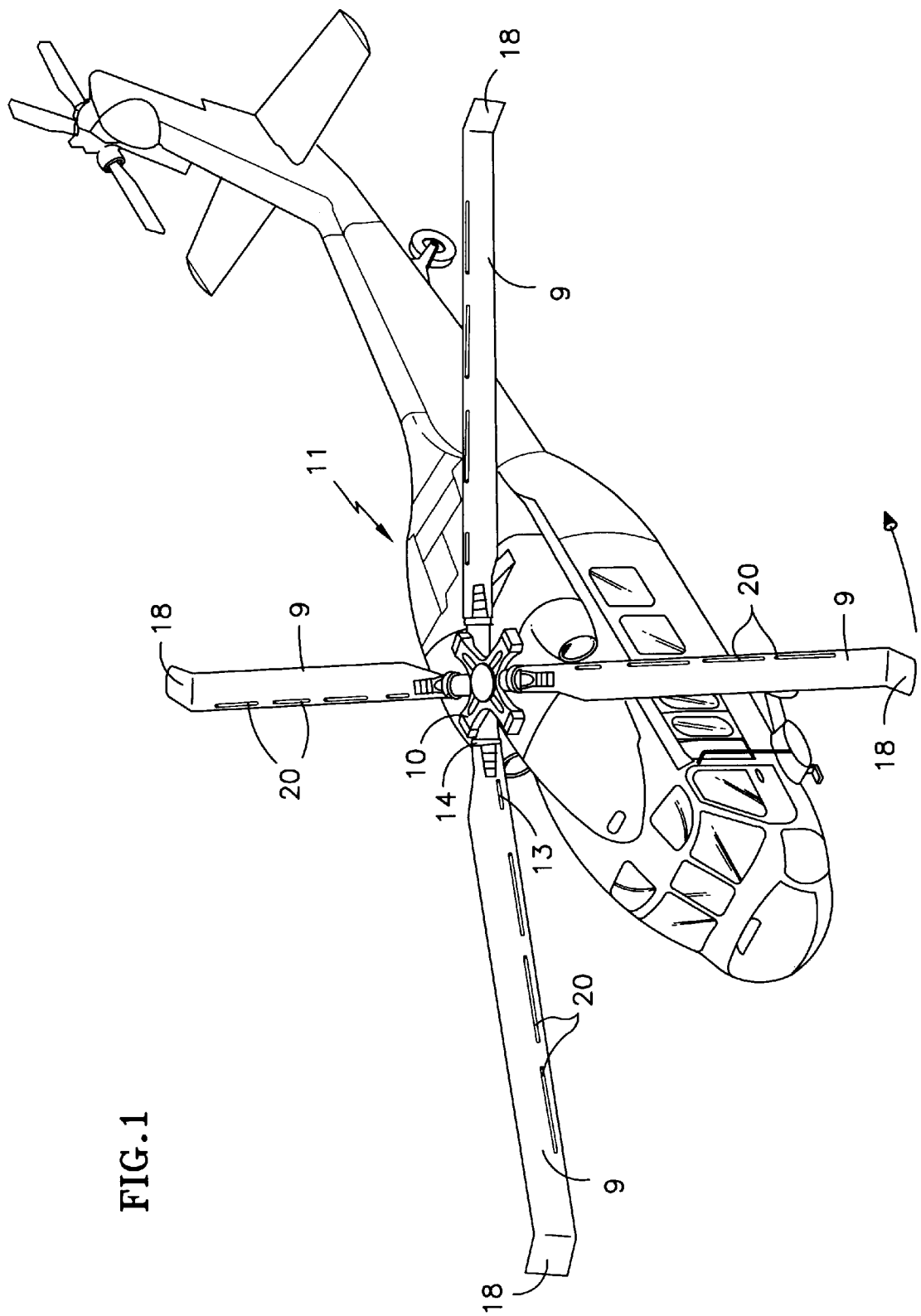
FIG. 1 is a perspective view of a helicopter employing the invention.
Figure 2:
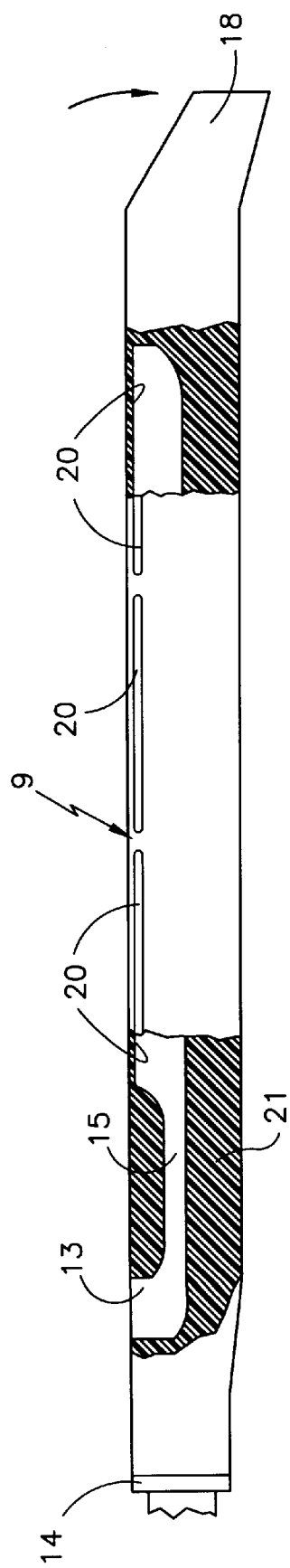
FIG. 2 is a partial, partially sectioned, top elevation view of a helicopter blade employing the present invention.

Referring to FIGS. 1 and 2, the blades 9 of the main rotor 10 of a helicopter 11 have an inlet slot 13 near the root 14 of the blade, feeding an air plenum 15 that extends outwardly toward the tip 18 of the blade. Slots 20 allow pressurized air within the plenum 15 to flow outwardly into the boundary layer on the suction surface (upward in normal flight) of the blades 9. As the blades rotate, in a direction shown by arrows in FIGS. 1 and 2, air is forced into the inlet 13, and due to relative high rotary speed, the centrifugal force acting on the air mass draws the air within the plenum 15 outwardly toward the tip, creating a steady flow from the inlet 13 through the slots 20 in each blade. In some cases, it may be that only the slots closest to the tip will be used, in dependence on the flow which can be achieved with lower centrifugal force nearer the roots of the blades.

In the simplest embodiment of the invention, the entire system is passive, and air will flow continuously through the slots 20 whenever the rotor is turning. However, the invention may also be used in a system in which valving is provided, either at the inlet 13, in the throat of the plenum 15, or at the slots 20, to provide pulsation of airflow into the boundary layer.

The invention as applied in FIGS. 1 and 2 provides air having high momentum flux into the boundary layer on the suction side of a blade, thereby to deter or eliminate boundary layer separation. The positioning of the slots 20, which may be on the order of 4% to 10% of the chord of the blade or even further downstream, will be determined for each particular blade design and corresponding operational parameters.

Figure 3:
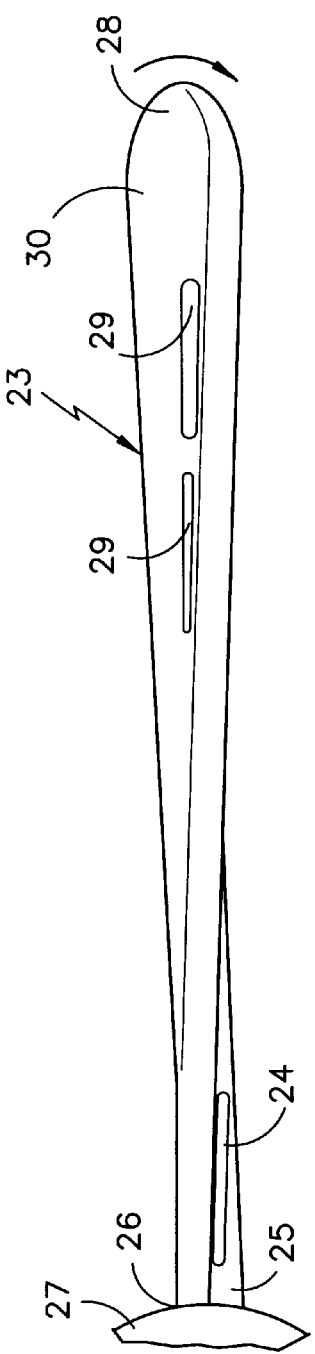
FIG. 3 is a stylized front elevation view of a blade employing the present invention.

The air inlet is shown in FIGS. 1 and 2 as being at the leading edge of the blade 9. However, since the boundary layer effects which the invention is designed to accommodate are more severe at high blade angles, the inlet 13 may be located slightly on the pressure side of the blade (the side opposite of the slots 20) as shown in FIG. 3, for maximum forcing during operation at high angles of incidence. Helicopter blades normally have hollow structural spars with lightweight honeycomb trailing edge pockets 21; therefore, there is ample space for the invention.

Figure 4:
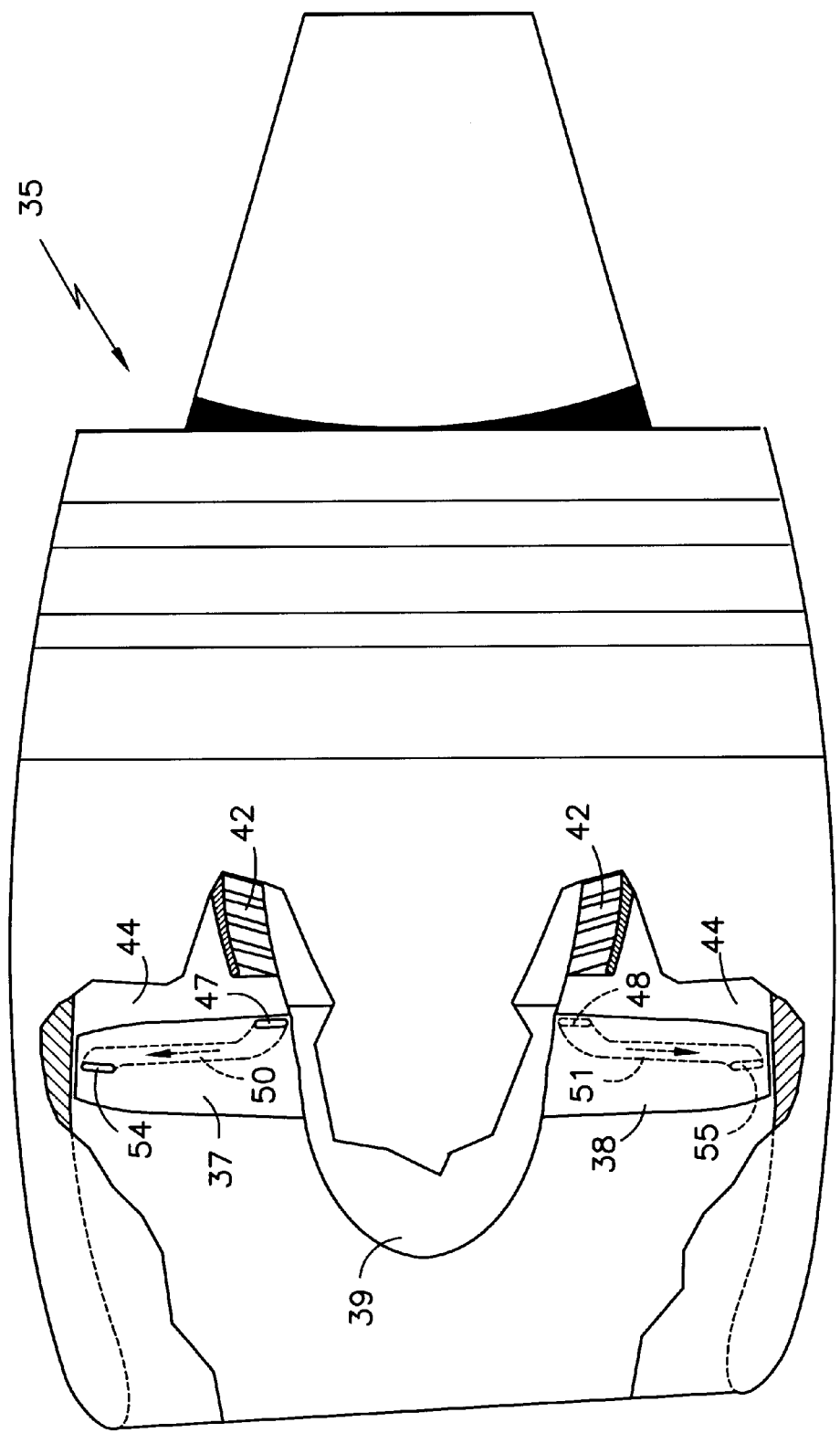
FIGS. 4 and 5 are partially broken away and sectioned side elevation views of a gas turbine engine employing the present invention.
Figure 5:
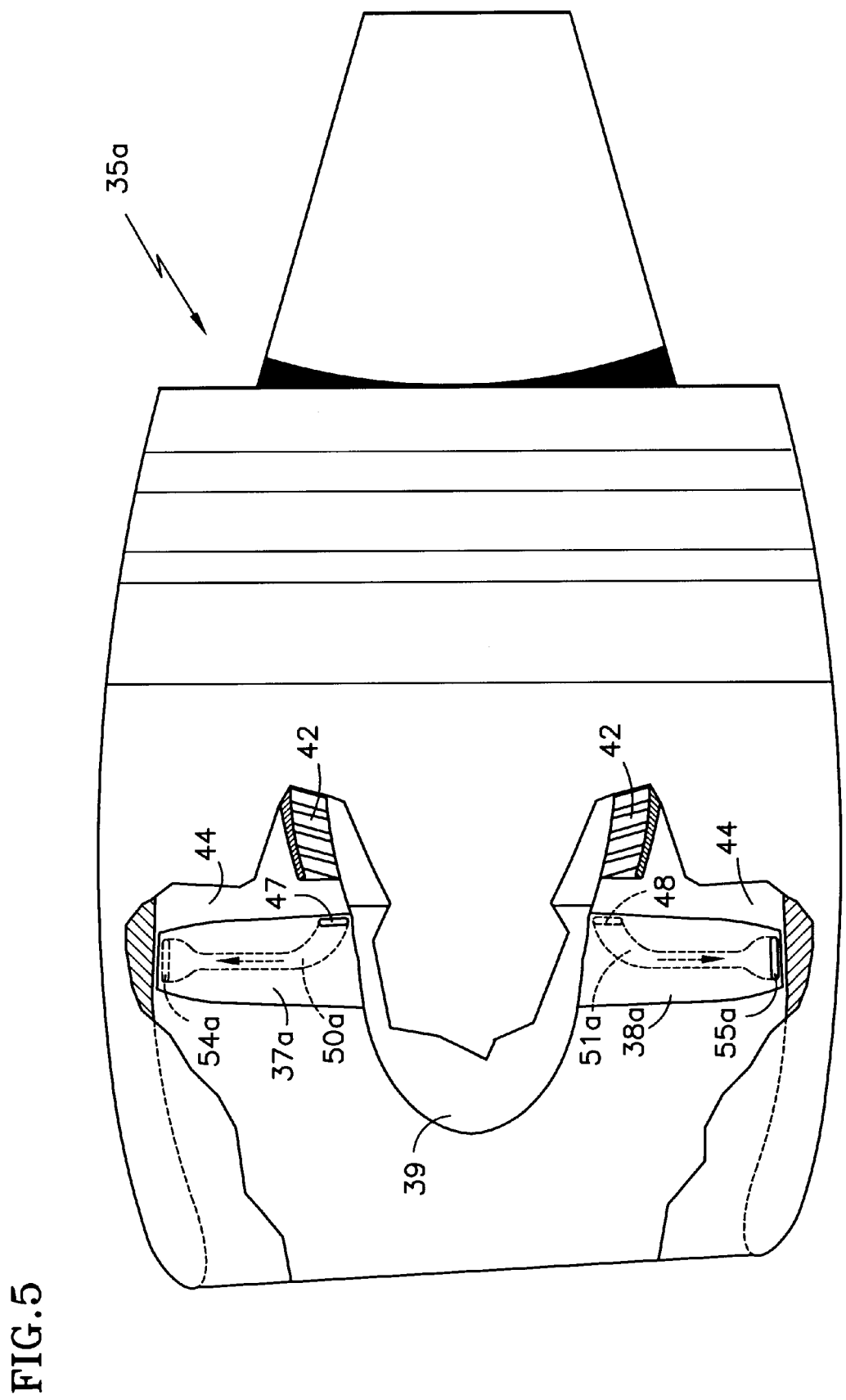
Figure 6:
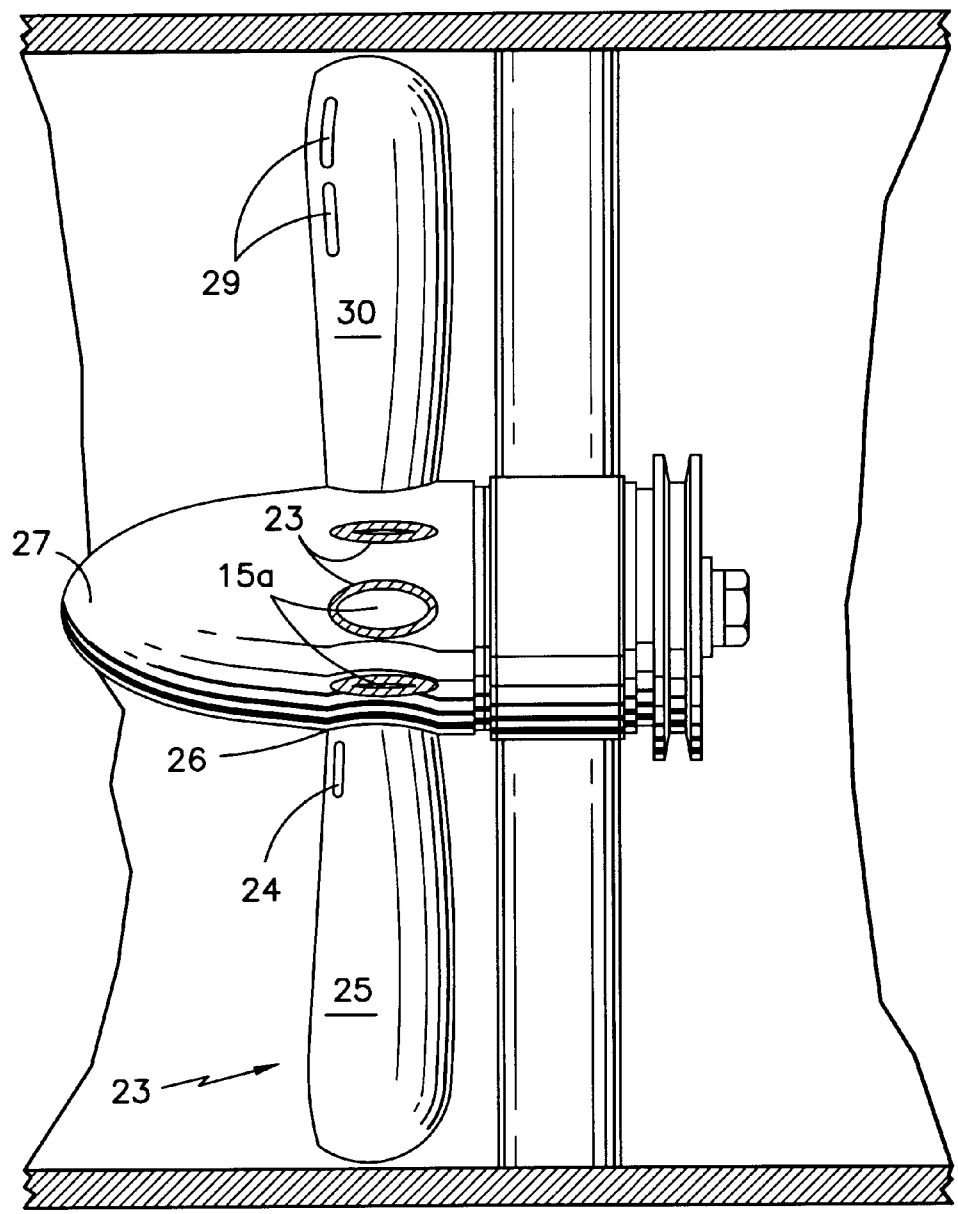
FIG. 6 is a partial, stylized, partially sectioned, side elevation view of an air moving machine fan employing the present invention.

Referring to FIG. 3, a blade 23 has an air inlet 24 passing through the pressure surface 25 thereof near blade root 26, adjacent the hub 27. The inlet feeds a plenum (not shown, similar to that in FIG. 2) which forces the air outwardly toward the tip 28 of the blade, and outwardly through slots 29 that pass through the suction surface 30 of the blade. The blade 23 may be the first stage of a gas turbine engine, as shown in FIGS. 4 and 5, or it may be part of a fan utilized to move air in an HVAC system as shown in FIG. 6, or any other fan. In FIG. 6, the blades are shown hollow, providing for the plenum 15a.

Referring to FIG. 4, a jet engine 35 includes a fan 36 having blades 37, 38 (and additional blades, not shown) attached to a hub 39. In FIG. 4, it is assumed that the blade 37 is retracting away from the reader, so that the suction surface thereof is viewed in FIG. 4, while the blade 38 is advancing toward the reader, so the pressure surface thereof is viewed in FIG. 4. Air pressurized by the fan 36 near the root of the blades flows into the core of the engine, depicted in FIG. 4 as blades and vanes of the low compressor 42. The remaining air pressurized by the fan 36 passes through the bypass duct 44 to provide the principal thrust of the engine, all as is conventional. In accordance with the invention, each blade 37, 38 has an air inlet slot 47, 48 near the trailing edge of the suction surface thereof. The inlet slot is in gas communication with an air passage 50, 51 which leads to corresponding air exit slots 54, 55 near or aft of mid-chord of the suction surface of each blade. A principal benefit of the embodiment of FIG. 4 derives from the suction in the core flow region which reduces fan blade wake blockage and thereby increases core flow capacity. A second principal benefit is that the suction increases fan rotor efficiency, which in turn results in reduced compression work for any given overall pressure ratio of the engine. The suction of the invention illustrated in FIG. 4 at the slots 47, 48 thereby increases overall engine efficiency. An additional benefit of the embodiment of FIG. 4 is that the steady blowing through the air exit slots 54, 55 in the vicinity of the point where supersonic shock and boundary layer separation occur, mitigates the blade surface air speed gradient and delays the onset of boundary layer separation. This also will increase the efficiency of the blades in pressurizing air into the bypass ducts 44.

Referring to FIG. 5, the blades 37a, 38a of a jet engine 35a have the same air inlet slots 47, 48 as described hereinbefore with respect to FIG. 4, thereby to reduce fan blade wake blockage at the entrance to the core engine as described hereinbefore. However, the air ducts 50a, 51a formed within the hollow blades 37a, 38a lead in this instance to air exit slots 54a, 55a formed near the tip edge on the pressure side of the blades. This provides a flow of air ahead of the blade which counteracts the suction caused by the blade tip which results in blade tip leakage. Reduction of blade tip leakage will increase the overall efficiency of the fan as it pressurizes air into the bypass duct 44.

Instead of using single slots, multiple slots, separated spanwise or streamwise from adjacent slots may be used.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A helicopter rotor blade comprising:
   a hub, a leading edge, a tip, a root, a pressure surface and a suction surface;
   an air inlet extending through the pressure surface of said blade near said hub;
   a plurality of slots extending through the suction surface of said blade closer to said tip than to said hub near the boundary layer separation point of said suction surface; and a plenum within said blade extending from said air inlet to said slots. whereby as said blade rotates, air is forced into said air inlet and driven by centrifugal force along said plenum to exit from said slots into the flow of air adjacent said blade.

2. A blade according to claim 1 wherein:

said inlet is disposed near the leading edge of said blade.

3. A blade according to claim 1 wherein said air inlet extends through the pressure surface near the leading edge of said blade.

4. A blade which is part of the fan of an axial flow gas turbine engine having an air bypass duct, comprising:

a hub, a leading edge, a tip, a root, a pressure surface and a suction surface;

an air inlet extending through a surface of said blade near the trailing edge of said blade near the root of said blade;

one or more slots extending through a surface of said blade closer to said tip than to said hub; and a plenum within said blade extending from said air inlet to said one or more slots, whereby as said blade rotates, air is forced into said air inlet and driven by centrifugal force along said plenum to exit from said one or more slots into the flow of air adjacent said blade.

5. A blade according to claim 4 wherein:

said one or more slots extend through the suction surface of said blade, air exiting from said slot into the boundary layer of said suction surface providing air particles with significant momentum flux into the boundary layer of said suction surface, thereby delaying or preventing boundary layer separation.

6. A blade according to claim 5 wherein said one or more slots are disposed near the boundary layer separation point of said blade.

7. A blade according to claim 5 wherein said slots inject air substantially tangentially into said boundary layer.

8. A blade according to claim 5 wherein:

said slots are disposed either (a) near or (b) downstream of the mid-chord point of said blade.

9. A blade according to claim 4 wherein said inlet extends through the suction surface of said blade.

10. A blade which is part of the fan of an axial flow gas turbine engine having an air bypass duct and a core, said blade comprising:

a hub, a leading edge, a tip, a root, a pressure surface and a suction surface;

an air inlet extending through a surface of said blade near the trailing edge of said blade adjacent to the air inlet of said core to reduce fan blade wake blockage, thereby to increase core flow capacity;

one or more slots extending through a surface of said blade closer to said tip than to said hub; and a plenum within said blade extending from said air inlet to said one or more slots, whereby as said blade rotates, air is forced into said air inlet and driven by centrifugal force along said plenum to exit from said one or more slots into the flow of air adjacent said blade.

11. A blade according to claim 10 wherein said inlet extends through the suction surface of said blade.

12. A blade according to claim 10 wherein said one or more slots extends through the suction surface of said blade, air exiting from said slot into the boundary layer of said suction surface providing air particles with significant momentum flux into the boundary layer of said suction surface, thereby delaying or preventing boundary layer separation of the flow which will enter said bypass duct.

13. A blade according to claim 10 wherein said one or more slots is disposed near the tip edge of said blade.

14. A blade according to claim 10 wherein said one or more slots extend through the pressure surface along the tip edge of said blade.

15. A blade according to claim 10 wherein said one or more slots extends through said suction surface where supersonic shock occurs on said suction surface.

16. A blade according to claim 10 wherein said one or more slots extends through said suction surface either (a) near or (b) downstream of the mid-chord point of said blade.

* * * * *